March 9, 1954 R. M. REICHL 2,671,338
PIPE TESTING MACHINE
Filed Jan. 20, 1950 7 Sheets-Sheet 1

INVENTOR.
REYMOND M. REICHL
BY
Hammond & Littell
ATTORNEYS

March 9, 1954　　　　R. M. REICHL　　　　2,671,338
PIPE TESTING MACHINE

Filed Jan. 20, 1950　　　　　　　　　　　7 Sheets-Sheet 3

INVENTOR.
REYMOND M. REICHL
BY

ATTORNEYS

March 9, 1954

R. M. REICHL 2,671,338

PIPE TESTING MACHINE

Filed Jan. 20, 1950

INVENTOR.
REYMOND M. REICHL
BY
Hammond & Littell
ATTORNEYS

March 9, 1954

R. M. REICHL 2,671,338

PIPE TESTING MACHINE

Filed Jan. 20, 1950

INVENTOR.
REYMOND M. REICHL
BY
Hammond & Littell
ATTORNEYS

R. M. REICHL 2,671,338

PIPE TESTING MACHINE

Filed Jan. 20, 1950

INVENTOR.
REYMOND M. REICHL
BY
Hammond & Littell
ATTORNEYS

Patented Mar. 9, 1954

2,671,338

UNITED STATES PATENT OFFICE 2,671,338

PIPE TESTING MACHINE

Reymond Martin Reichl, Forest Hills, N. Y., assignor to Hydropress, Incorporated, New York, N. Y., a corporation of Delaware Application January 20, 1950, Serial No. 139,559

17 Claims. (Cl. 73—37)

This invention relates to a machine for testing the mechanical strength and fluid tightness of tubes, pipes and the like, and particularly is concerned with a machine utilizing hydraulic pressure for the purpose.

In previous machines, arrangements have been provided wherein pipes are fed between two sealing heads, one of the heads being moved by a short stroke hydraulic motor and the other head being mounted on a carriage shiftable along the frame of the machine and lockable in various positions as required.

In such a machine, the tube is moved between the two sealing heads, and the hydraulic motor ram operated to move the pipe into sealing relationship between the heads. Hydraulic pressure then is exerted or applied to the interior of the tube. The sealing heads can take various forms such as a flat plate or can be of the type known as an outside diameter sealing arrangement wherein the tube enters a sealing cavity in the end of the head itself. Some arrangements have provided for moving both heads and for control of the movement thereof, but these have not been entirely satisfactory for various reasons.

In previous devices, the stroke of the stationary housing hydraulic motor ram has been short and it has been necessary to unlock the movable carriage relatively often and shift the same according to the length of pipe involved.

One of the objects of the present invention is to provide a substantially automatically operable apparatus for testing tubes, regardless of their length within predetermined limits.

One of the features of the invention is the provision of a shiftable carriage with a hydraulic cylinder and ram or motor thereon and of a stationary housing having a hydraulic cylinder and ram. The stroke of the stationary housing ram is made sufficiently long so that normally it is not necessary to move the shiftable carriage for the usual range of lengths of pipe being tested.

In one aspect of the invention, the pipe is moved to a position between the two heads, clamped in place and then the hydraulic rams on the stationary housing and the shiftable carriage caused to advance simultaneously until their sealing heads have engaged the opposite ends of the tube, the movement of said rams or of one ram being controlled automatically. Hydraulic fluid, such as water, is then introduced into the interior of the tube under high pressure. Following the aforementioned fluid testing, the heads are retracted and the tested tube removed from the machine. The next tube to be tested then is fed to a position between the hydraulic rams and the operation repeated. It can be seen that within the limits of the strokes of the hydraulic rams, no unlocking and relocking of the shiftable carriage is required for each testing operation. Also, with the long stroke of the stationary housing hydraulic ram, pipe with considerable variation in length can be tested without readjustment of the position of the shiftable carriage.

Another object of the invention is to control the movement of the rams and sealing heads in an improved manner and to do so regardless of pipe length within certain limits. To carry out the last mentioned object of the invention, control circuits can be provided for controlling the movement of a head or heads toward the pipe ends.

In one form, a feeler or control means operable to control the movement of the stationary housing hydraulic ram as it approaches the tube to be tested can be employed. The ram is moved at high speed until it is at a predetermined distance away from the tube at which time movement thereof is slowed during the engagement of the sealing heads with the ends of the tube. Further movement, a predetermined distance to complete the sealing at the slow speed, can be controlled by a timer or other means so as to stop the sealing head at its proper position. This can be accomplished by means of a photoelectric cell or by means of mechanically operated switch arrangements having feeler elements connected therewith. The same arrangement also can be used to control the shiftable carriage ram or both rams.

Head movement control means also can be provided so as to position the head in spaced relationship to the next pipe to be tested so as to facilitate movement of the next pipe. For example, if the next pipe is longer, the head can be automatically moved away from the other head upon discharge of the pipe then being tested.

A still further form of the invention can employ means to move one of the clamping carriages with a pipe clamped therein toward the locked head, the other head then being advanced toward the other pipe end and engaged therewith. In this form, the locked movable head does not necessarily have a hydraulic ram associated therewith.

These and other objects, features and advantages of the invention will become apparent from the following drawings and description which are merely exemplary:

Figure 1:
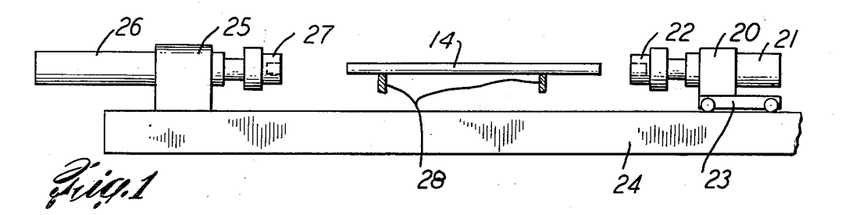
Figure 1 is a schematic view showing the machine with a pipe in position before the sealing heads have been advanced.
Figure 2:
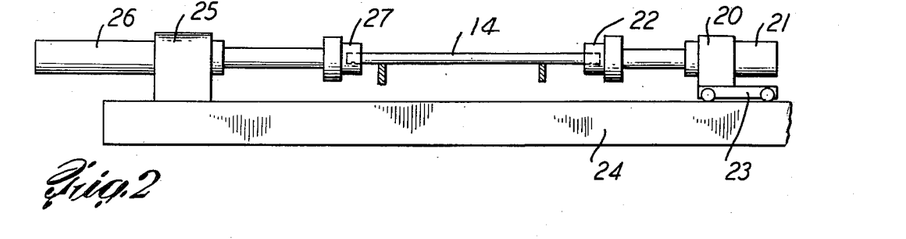
Figure 2 shows the pipe with the sealing heads of the machine engaging the ends thereof.

Referring to Figure 1, the shiftable carriage 20 has a hydraulic ram or motor arrangement 21, with a sealing head 22 attached thereto. The carriage 23 is movable on frame 24, said carriage being capable of being locked in any predetermined position thereon, the locking means not being illustrated in this figure. The stationary housing 25 has hydraulic motor 26 operable to reciprocate the stationary housing sealing head 27. The pipe 14 to be tested is illustrated as being supported on suitable rails or guides 28 in alignment with the sealing heads.

After the pipe 14 is clamped in position between the two hydraulic sealing heads, pressure is applied to each of the hydraulic motors 21 and 26 simultaneously so that sealing head 22 and sealing head 27 move toward each other and will engage the ends of pipe 14 to hold the same in a fluid tight relationship. As will be explained hereafter, the movement is controlled.

In one form, only the stationary housing has a hydraulic ram for moving the sealing head, the other sealing head being moved mechanically or the movement of the shiftable carriage used to position it relative to the stationary housing sealing head. In the preferred form, each sealing head is moved by a hydraulic motor. Liquid then can be introduced into the interior of the pipe so as to test the strength thereof and to determine if there are any leaks. The movement of the head or heads, as sealing relationship is approached, is controlled by first slowing down the head, and then moving it a predetermined further distance, so as to complete the sealing or movement over the tube end.

In a preferred aspect, a timer is actuated at the time the movement of the head is slowed for the purpose of stopping the movement after a predetermined time, selected such that the sealing will be completed.

Figures 3, 6:
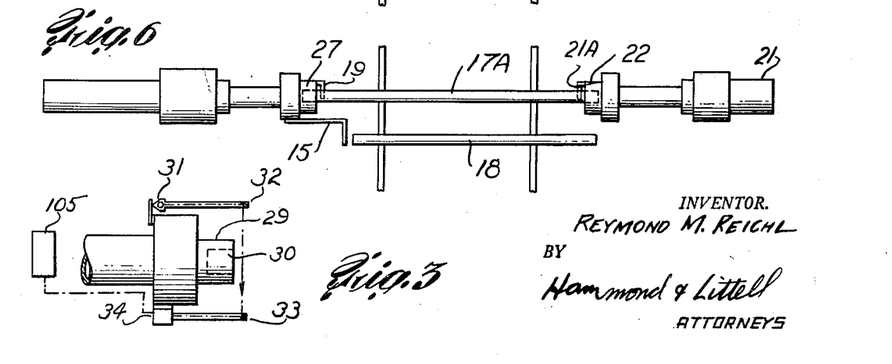
Figure 3 diagrammatically shows one arrangement employing a photoelectric cell control for controlling the movement and the speed of advance of the head.
Figure 6 shows the relation of the parts when the next pipe to be tested is shorter than the previous pipe.

One means of controlling the operation of the stationary housing hydraulic motor is by the photoelectric cell arrangement illustrated in Figure 3. The sealing head is seen at 29 having an aperture 30 therein into which one end of the pipe is insertible. A source of light is indicated at 31 with mirrors 32 and 33 directing the light in front of the face of sealing head 29 to photo-cell 34, said photo-cell being shown diagrammatically connected to a control box 105. The sealing head 29 as it approaches the end of the pipe can be operated at a high rate of speed until the pipe cuts off the beam of light. At this time, circuits can be energized to change the rate of fluid delivery to hydraulic motor 26 or to operate suitable relief valves so as to reduce the speed of movement thereof as the pipe enters aperture 30 in the sealing head. Preferably, a timer circuit is employed so as to stop the movement of the sealing head 29 a predetermined time after the rate of advance thereof is slowed causing the sealing head to move on to the end of the pipe a predetermined distance.

Figure 4:
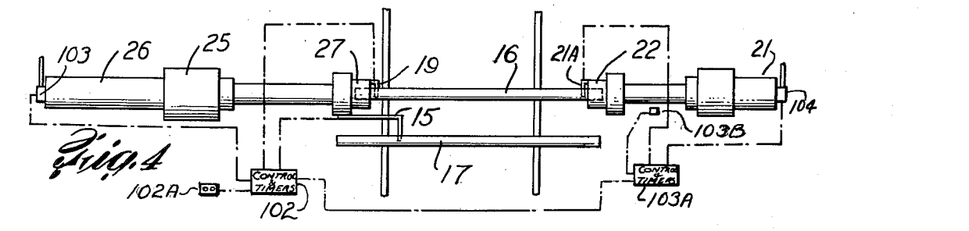
Figure 4 shows another form of a feeler gauge arrangement.
Figure 5:
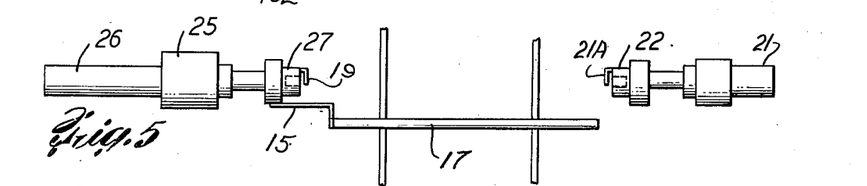
Figure 5 shows the arrangement of Figure 4 in another position, some of the controls being omitted.

As a preferred example of a manner in which the apparatus may be operated, particularly when pipes or varying lengths are being tested, reference may be made to Figures 4, 5, and 6. In Figure 4, pipe 16 is located in testing position between the movable carriage sealing head 22 and stationary housing sealing head 27. The sealing head may have a feeler guage 15 thereon engageable with the next pipe 17 to be tested. The feeler gauge 15 may be connected through suitable circuits to control operation of the hydraulic motor 26 so as to cause withdrawal of movement of the head to a position where the pipe can move into position between the sealing heads, as now will be described.

Upon completion of the testing of pipe 16, circuits may be energized automatically or otherwise, to cause withdrawal of both of the sealing heads from the ends of the pipe being tested. Feeler 15 engages the next pipe to be tested and is connected with the control circuit to cause continuation of the withdrawal of sealing head 27 after it has cleared the end of pipe 16 until the feeler leaves pipe 17 and the head reaches the position illustrated in Figure 5. At this point, sealing head 27 has been moved sufficiently far beyond the adjacent end of pipe 17 so that pipe 17 can be moved between the sealing heads 22 and 27. In this aspect, if the next pipe 18 (Fig. 6) is shorter, the head will move a predetermined distance away from the pipe end 17A as governed by feeler 19 which latter is described hereinafter.

In another arrangement of the invention suitable where the next pipe is shorter, provisions can be made to immediately move the sealing head after the previous pipe has been unloaded to a point where the feeler gauge engages the end of the next pipe. Then, when the circuit again is energized for testing the next pipe, the movement of the head will be only that from the point where the feeler gauge engages the end of the pipe to a sealing relationship, the movement of the pipe being controlled as described. It is to be understood, however, that this aspect of the control can be omitted.

Various types of feeler switches can be used, such as photoelectric cells or switch actuators of the type illustrated in copending application, Serial No. 139,707, filing date, January 20, 1950, which has now become Patent No. 2,573,139, issued October 30, 1951.

Similarly, a slow-up and control feeler gauge 19 (Figs. 4 to 6, inclusive) can be used in place of the photocell illustrated in Figure 3. In such a case, the movement feeler gauge 19 may be connected to a control box 102, said control box or arrangement being connected with the control valve 103 for motor 26. Feeler 15 also can be connected to control box 102 for controlling operation of motor 26. Hydraulic motor 21 also may be controlled by movement feeler gauge 21A which can be connected to a control arrangement 103A for controlling valve 104 of motor 21.

Figure 7:
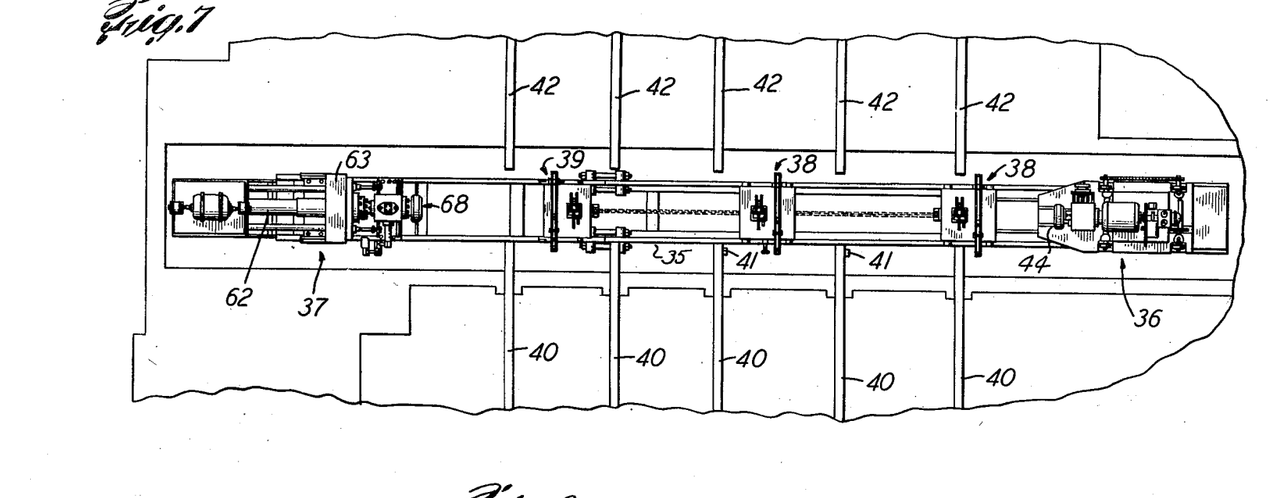
Figure 7 is a plan view of one form of the machine.
Figure 8:
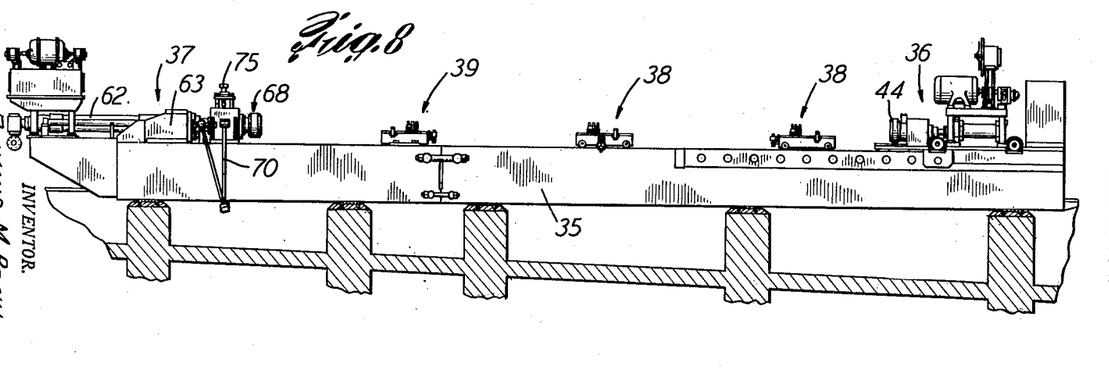
Figure 8 is a side elevation of Figure 7.

As an example of one type of machine which can be used for the purpose, reference may be made to Figures 7 and 8 wherein frame 35 has a shiftable carriage 36, mounted thereon, and a stationary housing 37 at the opposite end thereof. Shiftable carriage 36 has sealing head 44 and stationary housing 37 has sealing head 68. Located between said sealing heads are movable clamping carriages 38, 38 and a stationary clamping carriage 39.

As an example of one method of operation, the pipe to be tested can be fed or rolled on racks 40 toward the center line of the testing machine. Suitable stops 41, 41 can be employed to arrest movement of the pipe. After the pipe has been loaded onto and clamped by the clamping and loading carriages 38, 38, and 39, the control circuits can be suitably energized so that the sealing heads will move together to engage the ends of the pipe. Fluid pressure is then introduced into the pipe to mechanically and hydraulically test the same. Following the testing of the pipe, the sealing heads move apart and the pipe unloaded in some suitable manner onto guides 42.

*Stationary housing*

Figure 10:
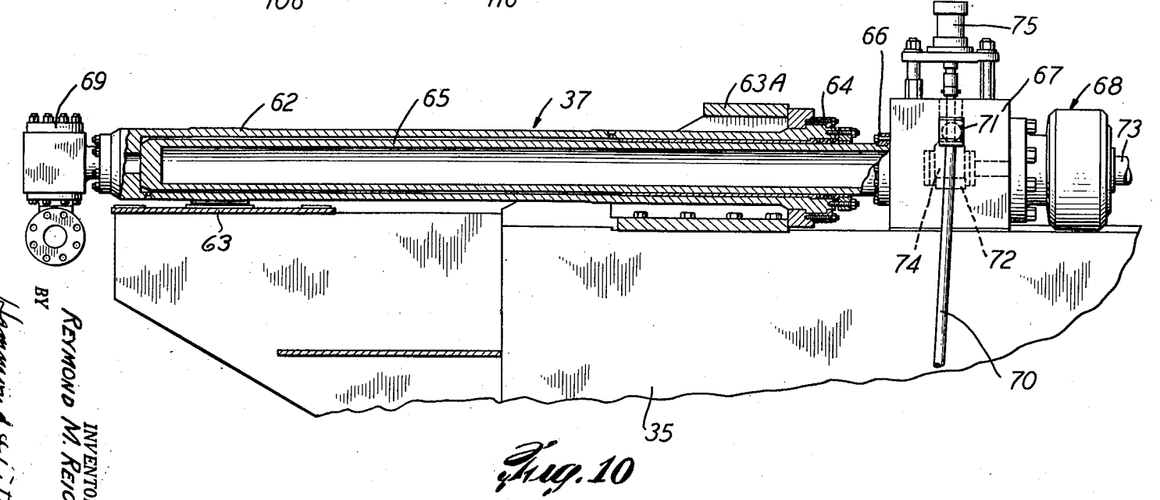
Figure 10 is an enlarged view of one form of a hydraulic motor arrangement for the stationary housing.

The stationary housing is illustrated in detail in Figure 10. Hydraulic cylinder 62 is supported on the machine frame 35 by seat 63 and by support 63A, the cylinder being bolted on support 63A by bolts 64. Piston or ram 65 is fastened at 66 to the slidable valve box or sealing head support 67, said valve box having the sealing head 68 fastened thereto. A suitable hydraulic valve 69 can be provided at one end of the cylinder 62 for controlling admission and exhaust of operating fluid to the hydraulic cylinder 62 for causing movement of sealing head 68. It is to be noted that the hydraulic cylinder and ram are arranged so that the ram has a long travel. The actual stroke will depend upon the variation in tube length to be tested without shifting the movable carriage and may amount to six feet or even be as long as eleven feet or more. Pipe 70 is mounted with a swivel connecting means 71 to the valve box, there being a passageway therefrom to valve cavity 72. The other end of pipe 70 is connected in some suitable manner with the testing fluid supply through suitable control means. The admission or exhaust of testing fluid to the interior of pipe 73 is controlled by valve 74 operated in any suitable manner by hydraulic cylinder 75.

*Clamping carriage*

One of the shiftable clamping carriages 38 suitable for use in the invention will be described in detail, it being understood that the fixed clamping carriage 39 has parts similar to the movable clamping carriages with the exception of the mechanism provided for movement of the movable carriages. The loading carriage involved is the subject of copending application Serial No. 139,708, filed January 20, 1950. Carriage frame 79 (Figs. 11, 12, and 13) has rollers 80 rollable upon the frame sides of the machine. Lower rollers 81 carried by members 82 can be provided, said lower rollers 81 cooperating with angle member or track 83 fastened to the machine frame 35 to keep the carriage properly seated upon the frame sides 35 of the machine at all times.

Figure 11:
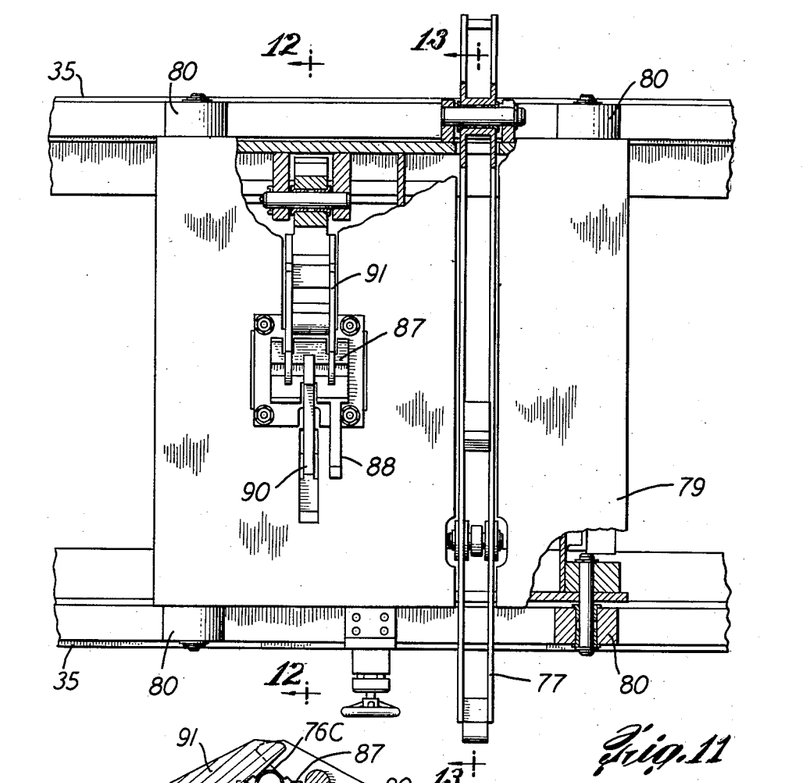
Figure 11 is an enlarged plan view of one form of the movable loading and clamping carriages which can be used in Figures 7 and 8.

A suitable loading mechanism such as that shown generally at 77 can be used to automatically move pipe to and away from the saddle on the clamping carriage.

Figure 12:
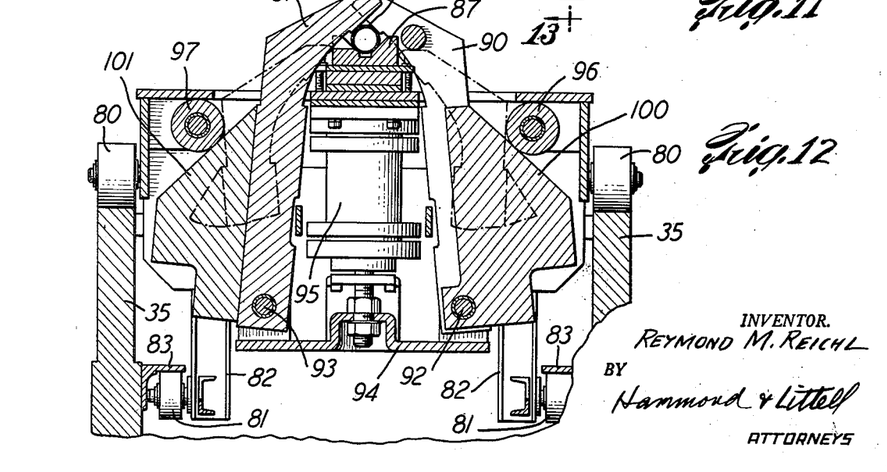
Figure 12 is a fragmentary sectional view taken along the line 12—12 of Figure 11.
Figure 13:
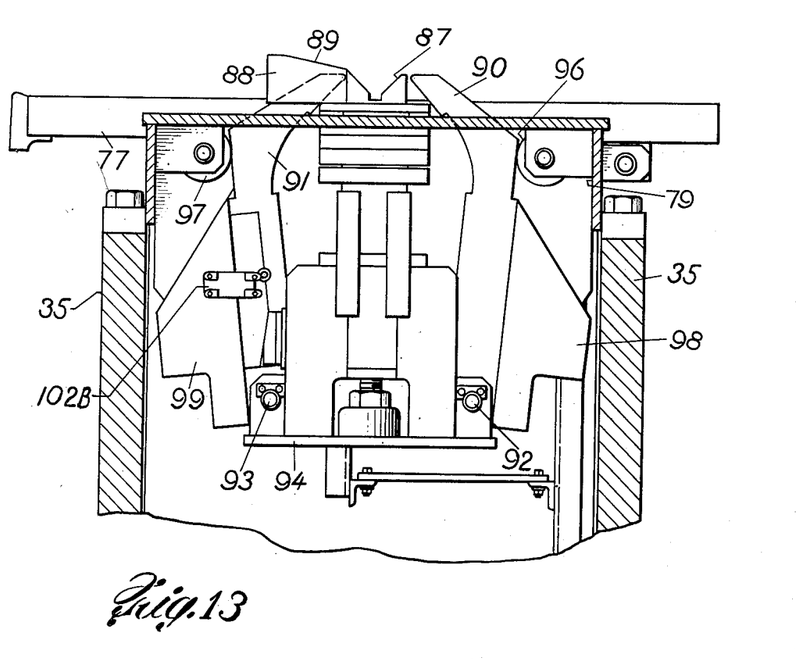
Figure 13 is generally similar to Figure 12 with the exception that the clamping arms are shown in retracted position.

At the time the loading and unloading takes place, the clamping means is in an unclamped position as seen in Figure 13. The clamping means is carried by the carriage frame 79 and may comprise a pair of clamping elements or arms 90 and 91, said clamping elements being pivoted at 92 and 93 to the movable means or elevating element 94. The movable means 94 is reciprocable vertically by means of hydraulic cylinder 95 (Fig. 12).

When the movable means 94 is in its lowered position (Fig. 13), cam rollers 96 and 97 permit the outward movement of said clamping members 90 and 91 under the influence of counterweights 98 and 99. The pivots 92, 93 and weights are so located as to cause the clamping members 90, 91 to move outwardly to unclamped position as the movable means 94 is lowered.

After pipe 76C is in place on saddle 87, hydraulic cylinder 95 is operated in such a manner as to raise the movable means 94 and this causes the pivoted clamping arms 90 and 91 to be raised upwardly. Cam surfaces 100 and 101 of the counter-weights will be contacted by cam rollers 96 and 97 to force the clamping members 90, 91 toward each other whereby pipe 76C is clamped in saddle 87.

Figure 9:
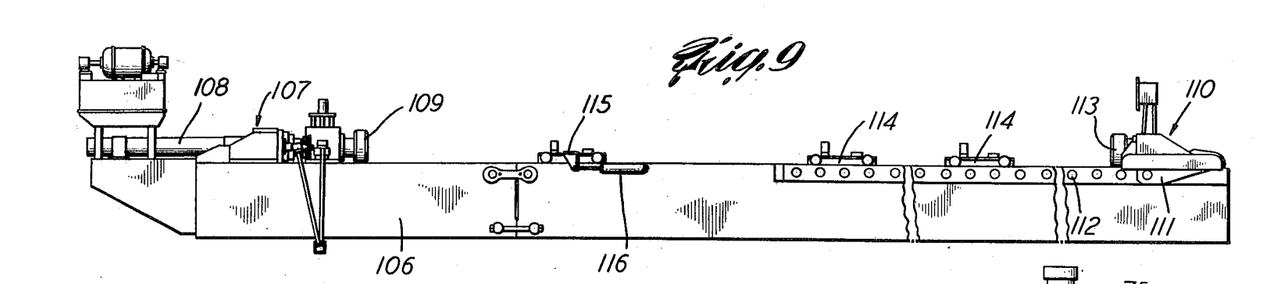
Figure 9 is a schematic side view of another form of the invention.

Another form of the invention is illustrated in Figure 9 wherein side frames 106 have a stationary housing 107 with a hydraulic motor 108 mounted thereon. Hydraulic motor 108 operates sealing head 109 in a manner similar to that described for the previous figures. Shiftable head 110 is arranged with a locking mechanism 111 cooperating with the locking apertures 112. Sealing head 113 of the shiftable head is fixedly located upon the shiftable head 110. Clamping carriages 114, 114 may be similar to the movable carriages described for the previous forms. Shiftable carriage 115 may have hydraulic motor arrangement 116 for moving the carriage 115 a limited distance for the purpose about to be described.

In operation, the pipe is loaded onto carriages 114, 114, 115; the right end of the pipe being adjacent sealing head 113. The clamping mechanism of carriage 115 then can be operated and the hydraulic motor 116 thereof actuated to move the carriage 115 and pipe to the right. This will serve to engage the right end of the pipe with the sealing aperture in sealing head 113. Thereafter, hydraulic motor 108 can be operated so as to engage sealing head 109 with the left hand end of the pipe. Limit switches and movement control devices can be applied to the form illustrated in Figure 9 in a manner similar to that described for the previous devices.

An example of one type of control circuit is illustrated schematically in Figure 4 and previously has been described in part hereinbefore. At the start of the operation, the various pumps (not shown) or source of pressure can be energized and then a suitable push button 102A actuated to energize the automatic control circuits which are represented by box 102. The loading means can be operated by the control and the clamping arms (Fig. 13) moved to clamping position (Fig. 12). When limit switch 102B (Fig. 13) is operated, the controls for energizing valves 103 and 104 function to cause the forward stroke of both cylinders to start. When the pipe ends actuate switches 19 and 21A, the forward movement of the heads will be slowed and at the same time, adjustable timer means actuated to move the heads a predetermined distance for which said timers are set, the sealing movement being completed at a slower rate. A pipe filling control timer in box 102 also can be started, said timer being connected with the filling control in a suitable manner (control 75, Fig. 8) to cause filling of the pipe to start a predetermined time after the movement of the sealing heads is slowed, the filling control being interrupted by suitable timer means after the pipe is filled. Another timer, or one of the same timers, can be employed to cause operation of a pressure intensifier (not shown) and/or to hold the pressure in the pipe for a time sufficient for the testing. Thereafter, one of the timers or a different timer can be employed to decompress the fluid in the pipe and cause the sealing heads to be moved apart. The shiftable carriage head can be stopped by a suitable limit switch 103B. The stationary housing head is moved, as previously described, until the feeler 15 reaches the end of the next pipe if the next pipe is longer, or is moved a predetermined distance beyond the end of the pipe being tested. When both cylinders stop, the pipe can be unclamped by the control and the machine is then in condition for the next testing operation. It is to be understood that other control arrangements can be employed and that various arrangements of timers can be made.

Figure 14:
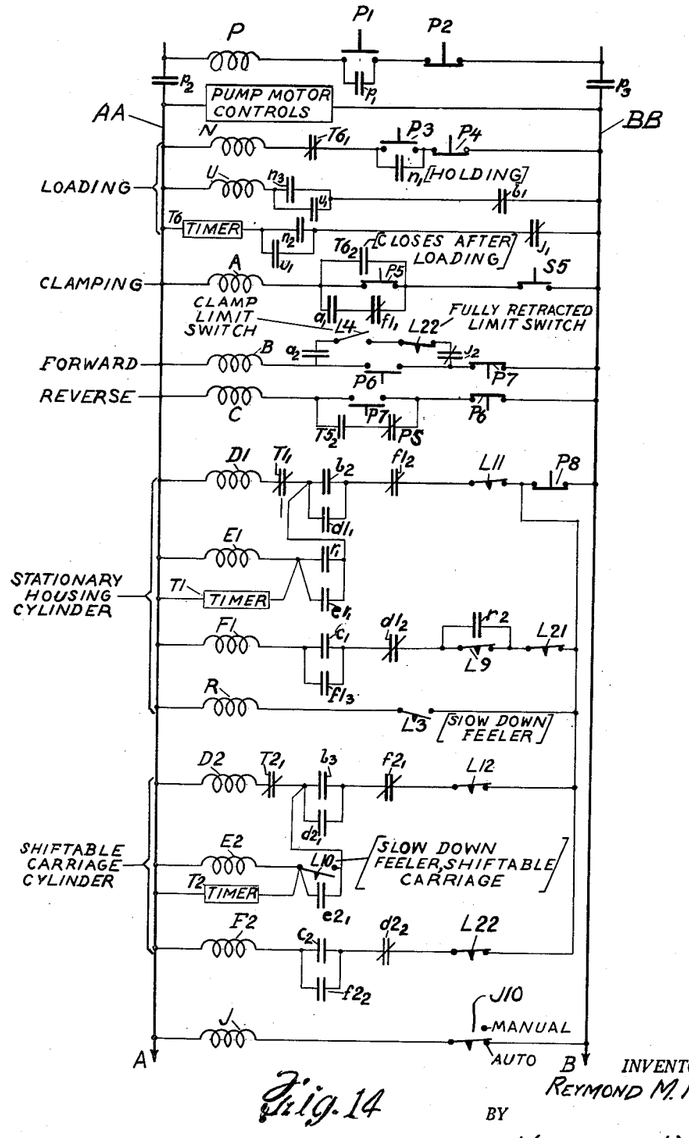
Figure 14 is a portion of a schematic wiring arrangement illustrating one form of control circuit.
Figure 15:
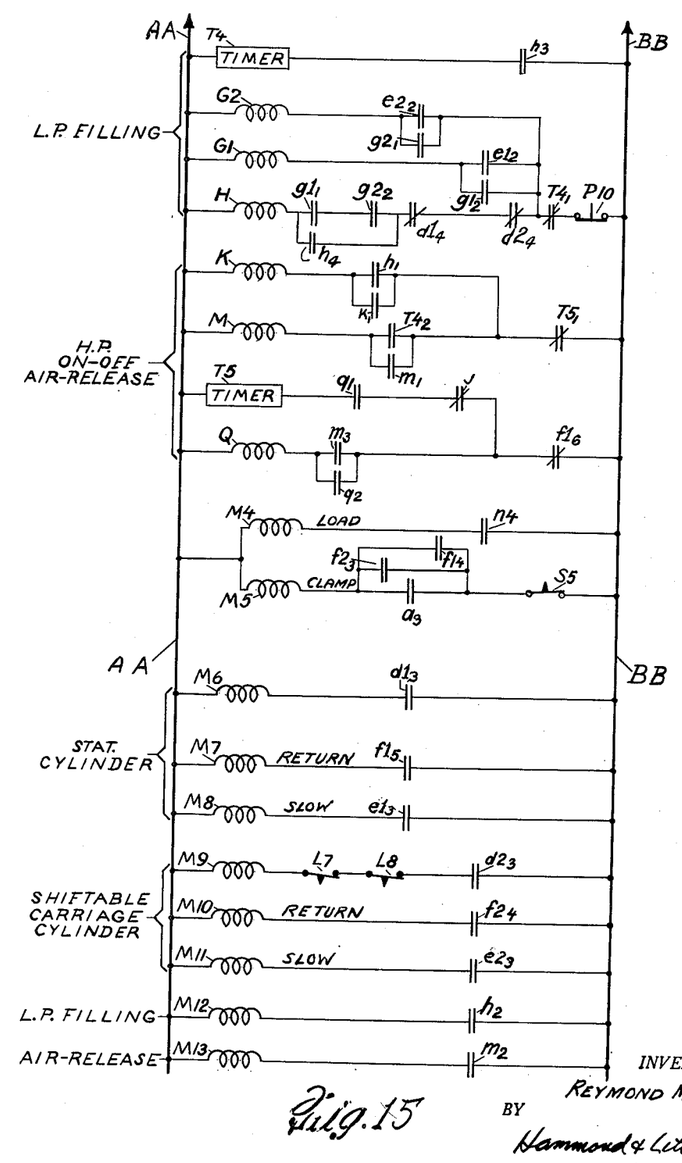
Figure 15 is an extension of Figure 14.

A specific example of a manner in which the control circuit can be connected is illustrated in Figures 14 and 15, Figure 15 being an extension of Figure 14. For purposes of clarity, the diagram is executed in the conventional manner of schematically showing control and power circuits, the solenoids not being shown mechanically connected to the switch contacts operated thereby; solenoids or relay operators being indicated by a capital letter, and the switch contacts operated thereby being shown by corresponding small letters and appropriate subscripts. Switches which are normally closed have a diagonal line extending across the symbol. The term "solenoid" will be used to denote the relay operator involved. Various types of timers can be used, one type being that illustrated in United States Patent No. 2,175,864.

Control busses AA and BB are connected with the source of control current by actuation of push button P1 which energizes solenoid P to close contacts $p_1$, $p_2$, and $p_3$. These will energize the pump motor controls for starting various pumps required in the operation of the testing machine, as well as energize the main control busses.

When it is desired to start the automatic cycle in operation, push button P3 is actuated, which will serve to energize solenoid or relay N to close contacts $n_1$, $n_2$, and $n_3$. Closing of switch contacts $n_1$ will provide a holding circuit for P3 thus holding solenoid N energized. Closing of contacts $n_2$ will energize timer mechanism T6. Closing of contacts $n_4$ (Fig. 15) can be used to actuate any suitable loading mechanism.

Contact $T6_1$ (Fig. 14) will be opened by the timer T6 after an adjustable time so as to de-energize solenoid N and thus the loading mechanism. An instant later, contact $T6_2$ can be set to be operated by timer T6 to energize solenoid A. This will cause switch contacts $a_3$ to close and thus energize the clamping actuator solenoid M5. When the clamping device closes, limit switch L4 (corresponding to 102B Fig. 13), will be actuated to energize solenoid B which in turn, through switch contacts $b_2$, $b_3$ will energize solenoids D1, D2. Solenoid M6 controlling the stationary cylinder will be energized by the closing of switch $d1_3$ and solenoid M9 for the shiftable carriage cylinder will be energized by the closing of switch $d2_3$, solenoids M6 and M9 suitably controlling the supply fluid to the cylinders involved. As the rams move the sealing heads forward, the pipe ends will actuate limit switch L3 on the stationary end and L10 on the shiftable carriage end for the purpose of slowing the movement and actuating certain timers to control the movement and rate of travel of the cylinders as they move into sealing relationship with the pipe ends. Closing of switch L3 will energize relay R which in turn will close $r_1$ to start timer T1 into operation. The closing of L10 will actuate timer T2. Also, solenoids E1 and E2 will be operated, these solenoids being arranged so as to suitably actuate the switches for slowing down the rate of travel of the two heads. Movement of the heads will be interrupted at the end of an adjustable time by actuation of switch contacts $T1_1$, $T2_1$ by their respective timers, thus stopping the heads.

Low pressure filling solenoid M12 will be energized by closing of contact $h_2$ by the solenoid H, which has been energized by closing of switch contacts $g1_1$, $g2_2$ actuated by switch contacts $e2_2$, $e1_2$ which have been closed by solenoids E1, E2, holding circuits being provided around the contacts as indicated. Solenoid M12 is interrupted by opening of timer contacts $T4_1$, said timer T4 having been actuated upon closing of contacts $h_3$ by solenoid H. Switch contacts $T4_2$ energize relay M which causes solenoid Q to be energized closing switch $q_1$, which starts timer T5 operating. Solenoid M13 controlling the air release mechanism also is operated by energization of solenoid M by switch contacts $m_2$.

High pressure is exerted on the pipe for an adjustable time until timer T5 opens contacts $T5_1$ to interrupt the energization of solenoid M which in turn opens the various related switches. Thereafter, contact $T5_2$ energizes the reverse solenoid C. This causes relays F1, F2 to be operated to start the return stroke of the cylinders, these solenoids energizing return solenoids M7 and M10 through closing of switch contacts $f1_5$, $f2_4$. The movement of the shiftable cylinder head is stopped by limit switch L22 when the ram reaches the end of its stroke. The stationary cylinder head is stopped when the head has moved sufficiently far to clear the length of the next pipe to be tested because of actuation of feeler gauge L9 (corresponding to feeler gauge 15, Fig. 4), assuming that the next pipe is longer than the pipe just tested and so that L3 has been opened and $r_2$ opened. If the next pipe to be tested is shorter than the one being tested, the head will merely move a minimum stroke so as to clear the end of the pipe, this being determined by slow down feeler L3, switch $r_2$ keeping F1 energized until L3 is opened. When both cylinders are stopped, the tube is unclamped and the next operation can be commenced by again actuating push button P3.

If manual operation is desired, such can be accomplished by moving switch J10, to the manual position so as to de-energize J. Solenoid J holds various contacts designated $j$ with appropriate subscripts closed so as to render inoperative the various automatically operated portions of the control. The isolated portions can be actuated manually by operating suitable push buttons such as P6, P7. Various of the manual control push buttons and contacts *j* have been omitted for purposes of clarity. Different types of controllers and timers can be used and the specific connections may be other than those illustrated.

It is to be understood that the invention may take various forms and that the details of construction may vary from those illustrated without departing from the spirit of the invention except as defined by the appended claims.

What is claimed is:

1. A machine for internal pressure testing, between two sealing heads, of pipe or the like, comprising a frame, a stationary housing at one end of said frame having a long stroke hydraulic motor, a first pipe end sealing head reciprocable by said motor, a shiftable carriage spaced from said first sealing head and movably mounted on said frame and lockable in any one of a plurality of positions, a second pipe sealing head mounted on said carriage, means reciprocably moving said pipe and first sealing head axially relative to each other and into sealing relationship, and control means activated by a pipe automatically controlling the axial movement of at least one of said sealing heads relative to said pipe.

2. A machine for internal pressure testing, between two sealing heads, of pipe or the like, comprising a frame, pipe clamping means on said frame, a stationary housing at one end of said frame having a long stroke hydraulic motor, a first pipe end sealing head reciprocable by said motor, a shiftable carriage movably mounted on said frame, a second pipe sealing head mounted on said carriage, means including said hydraulic motor reciprocably moving said pipe and first sealing head axially relative to each other and into sealing relationship, means moving said second sealing head into sealing relationship with its pipe end, and pipe actuated control means activated automatically by a pipe controlling the axial sliding movement of at least one of said sealing heads onto said pipe.

3. A machine for internal pressure testing, between two sealing heads, of pipe or the like, comprising a frame, a stationary housing at one end of said frame having a long stroke hydraulic motor, a first pipe end sealing head reciprocable by said motor, a shiftable carriage movably mounted on said frame and movable to any one of a plurality of positions on said frame, a second pipe sealing head mounted on said carriage and having a hydraulic motor connected therewith, pipe actuated feeler means, and timer means connected with at least one of said heads and with said feeler means, said timer means being activated thereby and automatically controlling the movement of at least one of the sealing heads relative to said pipe.

4. A machine for internal pressure testing, between two sealing heads, of pipe or the like, comprising a frame, a stationary housing at one end of said frame having a pipe end sealing head, a pipe end sealing head mounted on a shiftable carriage on said frame, hydraulic ram means connected to at least one sealing head for axially moving the same relative to a pipe, and control mechanism connected with said ram and actuated by the pipe automatically controlling the axial movement of said pipe relative to the sealing head.

5. A machine for internal pressure testing, between two sealing heads, of pipe or the like, comprising a frame, a stationary housing at one end of said frame having a long stroke hydraulic ram, a first pipe end sealing head reciprocable by said ram, a shiftable carriage movably mounted on said frame and spaced from said first sealing head, a second pipe end sealing head mounted on said shiftable carriage, means reciprocably moving said pipe and sealing heads axially relative to each other into sealing relationship, control means connected to the sealing heads, and timer means responsive to the movement of said pipe relative to said sealing heads and connected to said control means automatically controlling the speed of axial movement of at least one of said sealing heads relative to said pipe.

6. A machine for internal pressure testing, between two sealing heads, of pipe or the like, comprising a frame, a stationary housing at one end of said frame having a long stroke hydraulic motor, a first pipe end sealing head reciprocable by said ram, a shiftable carriage movably mounted on said frame and spaced from said first sealing head, a second pipe end sealing head mounted on said shiftable carriage having hydraulic motor reciprocating means, means reciprocably moving said pipe and first sealing head axially relative to each other into sealing relationship, control means connected with said hydraulic motors, and pipe end detecting means adjacent the first sealing head, said detecting means being connected to said control means automatically controlling the axial movement and speed of said first sealing head onto a pipe end, said sealing head approaching at a fast rate and then being moved at a slow rate for a predetermined time thereafter at which time the head is stopped.

7. A machine for internal pressure testing, of pipe or the like, comprising a frame, a housing at one end of said frame for a reciprocable pipe end sealing head movable into sealing relationship relative to a pipe to be tested, head reciprocating means, and means connected to said reciprocating means controlling movement of said sealing head away from a pipe, including pipe end location responsive control mechanism connected to said head reciprocating mechanism operable to move said head at least a predetermined distance away from the end of the pipe just tested, and a predetermined distance beyond the adjacent end of the next pipe to be tested in the event the next pipe is longer relative to said end of the pipe just tested.

8. A machine for internal pressure testing, between two sealing heads, of pipe or the like, comprising a frame, a stationary housing at one end of said frame for a reciprocable pipe end first sealing head movable into sealing relationship relative to a pipe to be tested, hydraulic head reciprocating means, a shiftable carriage on said frame, a second sealing head on said shiftable carriage, and pipe end feeler means connected to said reciprocating means controlling movement of said first sealing head away from a pipe, including control mechanism operable to move said first head at least a predetermined distance away from the end of the pipe just tested and a predetermined distance beyond the adjacent end of the next pipe to be tested in the event the next pipe is longer relative to said end of the pipe last tested.

9. A machine for internal pressure testing, between two sealing heads, of pipe or the like, comprising a frame, a stationary housing at one end of said frame for a reciprocable pipe end first sealing head movable into sealing relationship relative to a pipe to be tested, hydraulic head reciprocating means, a shiftable carriage on said frame, a second sealing head on said shiftable carriage, a hydraulic motor connected to said second head, and pipe end detecting feeler means connected to said reciprocating means controlling movement of said first sealing head away from a pipe, including control mechanism operable to move said first head at least a predetermined distance away from the end of the pipe just tested and a predetermined distance beyond the adjacent end of the next pipe to be tested in the event the next pipe is longer than the pipe being tested.

10. A machine for internal pressure testing, of pipe or the like, comprising a frame, a housing at one end of said frame for a reciprocable pipe end sealing head movable into sealing relationship relative to a pipe to be tested, head reciprocating means, pipe end detecting means connected to said reciprocating means controlling movement of said sealing head away from a pipe, including control mechanism operable to move said head at least a predetermined distance away from the end of the pipe just tested and a predetermined distance beyond the adjacent end of the next pipe to be tested in the event the next pipe is longer than the pipe being tested, and control mechanism controlling axial movement of said head into sealing relationship with said pipe.

11. A machine for internal pressure testing of pipe or the like, comprising means moving a sealing head into and out of sealing relationship with a pipe end and applying fluid pressure thereto, pipe end detecting control mechanism including timer means connected with said detecting means and actuated thereby, said timer means being connected with said moving means and said fluid pressure means, said control means sequentially moving said head toward said pipe at one rate, actuating a timer and moving said head at a lower rate for a predetermined time relative to said head and then stopping the head, operating a filling mechanism to fill said pipe and maintaining pressure on said pipe for a predetermined time, and then retracting said head a predetermined distance from said pipe.

12. A machine for internal pressure testing, between two sealing heads, of pipe or the like, comprising actuating mechanism adapted to reciprocate said two sealing heads inwardly and outwardly to each other, pipe filling means, pipe detecting means located on at least one of said sealing heads, control mechanism including timer means connected with said detecting means, said timer means being energized as said head having pipe detecting means moves toward said pipe to slow the movement of said head and to move it a predetermined distance after it is slowed, and timer mechanism connected with said filling means for filling said pipe after said head is in sealed relationship therewith, and maintaining said pipe in filled condition for a predetermined period of time before releasing the pressure in said pipe.

13. A machine for internal pressure testing, of pipe or the like, comprising a frame, a housing at one end of said frame, a head reciprocably movable on said housing, said head being movable into sealing relationship relative to pipe aligned therewith, control means connected to said head, a pipe detecting mechanism mounted on said head having means connected to said control means operable by a pipe to control the movement of said head as it approaches a pipe aligned therewith.

14. A machine for internal pressure testing, of pipe or the like, comprising a frame, a housing at one end of said frame, a sealing head reciprocably movable on said housing, said head being movable into sealing relationship relative to a pipe aligned therewith, control means connected to said head, and a pipe detecting mechanism including a photoelectric means connected to said control means and responsive to the presence of a pipe to control movement of said head into sealing relationship with said pipe.

15. A machine for internal pressure testing, of pipe or the like, comprising a frame, a housing at one end of said frame, a sealing head reciprocably movable on said housing, said head being movable into sealing relationship relative to pipe aligned therewith, control means connected to said head, and a pipe detecting mechanism including a photoelectric means and timer mechanism connected to said control means, said photoelectric means being responsive to the presence of a pipe as said head approaches a pipe to slow movement of said pipe and actuating said timer mechanism to stop said head a predetermined distance after the slowing movement is commenced.

16. A machine for internal pressure testing, of pipe or the like, comprising a frame, a housing at one end of said frame, a head reciprocably movable on said housing, said head being movable into sealing relationship relative to a pipe aligned therewith, control means connected to said head, and a pipe detecting mechanism projecting from said head connected to said control means operable to detect and to control the movement of said head as it approaches a pipe aligned therewith, and a second pipe detecting mechanism connected to said control means and extending beyond said first pipe detecting mechanism operable to control movement of said head in accordance with the next pipe to be tested.

17. A machine for internal pressure testing of pipe or the like, comprising a frame, pipe clamping means on said frame, a stationary housing at one end of said frame having a hydraulic ram, a first pipe end sealing head reciprocable by said ram, a shiftable carriage movably mounted on said frame and spaced from said first sealing head, said carriage being lockable in any one of a plurality of positions, a second pipe end sealing head mounted on said shiftable carriage, a hydraulic ram connected to said second sealing head, and means moving said sealing heads inwardly relative to each other and into sealing relationship with said pipe after a pipe is located in said clamping means and clamped thereby.

REYMOND MARTIN REICHL.

References Cited in the file of this patent

UNITED STATES PATENTS

| Number | Name | Date |
|---|---|---|
| 2,183,974 | Richardson | Dec. 19, 1939 |
| 2,493,061 | Devine et al. | Jan. 3, 1950 |
| 2,497,193 | Webb | Feb. 14, 1950 |
| 2,522,927 | Camerota | Sept. 19, 1950 |

FOREIGN PATENTS

| Number | Country | Date |
|---|---|---|
| 401,621 | Great Britain | Nov. 16, 1933 |